May 6, 1969
F. D. HOWE ET AL
3,442,183
PISTON SUPPORTING MEANS
Filed Oct. 10, 1967
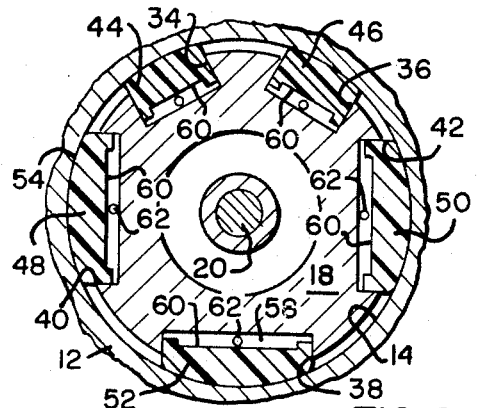
FIG. 2
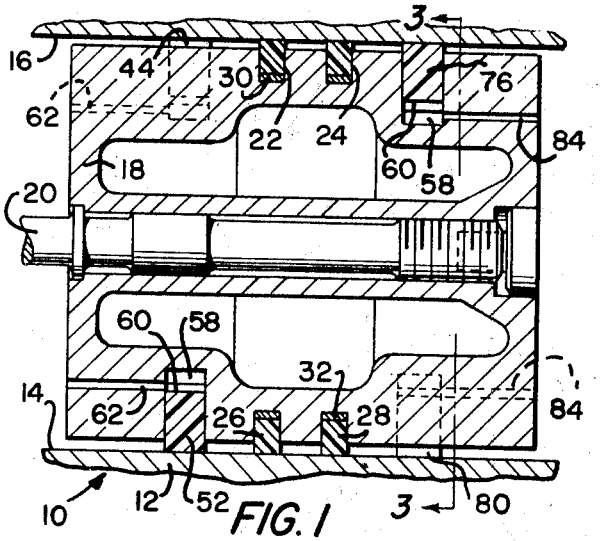
FIG. 1
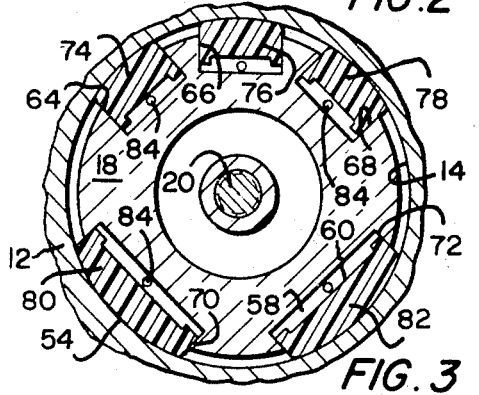
FIG. 3
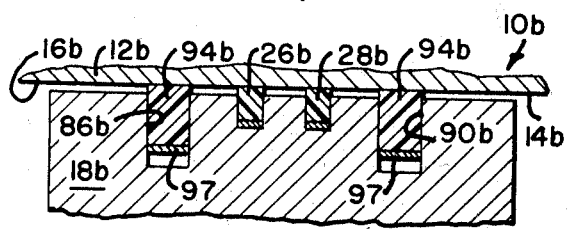
FIG. 8
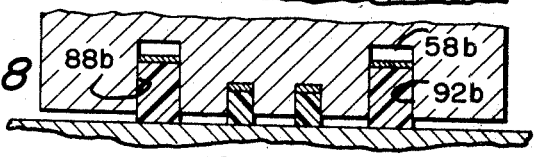
FIG. 7
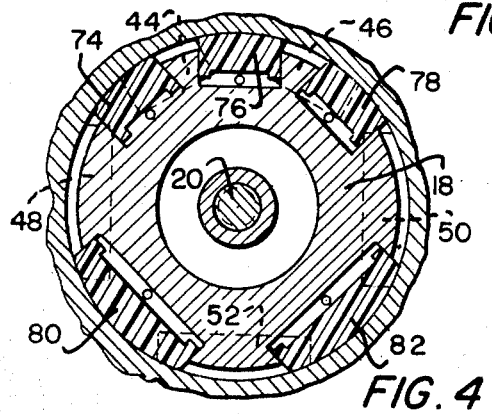
FIG. 4
FIG. 6
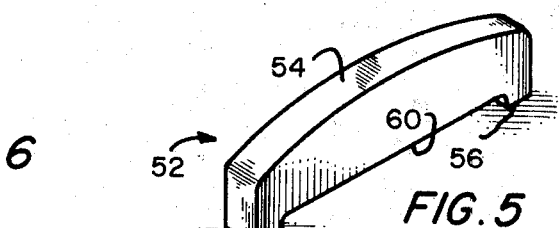
FIG. 5
INVENTORS
FRANK D. HOWE
JOSEPH P. SWIFT
ALLEN D. GROVES
Robert R. Paquin
ATTORNEY

United States Patent Office 3,442,183
Patented May 6, 1969

3,442,183
PISTON SUPPORTING MEANS
Frank D. Howe, Painted Post, Joseph P. Swift, Hammondsport, and Allen D. Groves, Painted Post, N.Y., assignors to Ingersoll-Rand Company, New York, N.Y., a corporation of New Jersey
Filed Oct. 10, 1967, Ser. No. 674,222
Int. Cl. F01b *31/00;* F16j *1/06*
U.S. Cl. 92—184                12 Claims

ABSTRACT OF THE DISCLOSURE

A reciprocating piston movably disposed in a cylinder bore and including a plurality of circumferentially spaced, peripheral grooves each slidably containing a supporting element. The supporting elements each include a surface peripherally defining a chamber in their respective one of the grooves and are biased into engagement with the wall bounding the cylinder bore to thereby support the piston in the cylinder bore.

Background of the invention

The present invention relates to pistons such as employed in a cylinder bore of a piston-type compressor and more particularly to the provision of new and improved means for supporting such a piston in a cylinder bore.

Conventionally, the reciprocation of a piston in a cylinder bore of a piston-type compressor frequently causes sliding friction between the piston outer circumference and the wall of the cylinder bore. This sliding friction is, of course, detrimental in that it causes wear of both the piston and the cylinder wall and is a possible cause of premature compressor failure.

Summary of the invention

The principal object of the present invention is to provide new and improved means for supporting a piston in a cylinder bore to thereby substantially minimize the aforedescribed sliding friction.

Another object of the invention is to provide a new and improved supporting means of the type set forth which, although relatively simple and economical in construction, is highly efficient and dependable in operation.

These objects, and those other objects and advantages of the invention which will be apparent from the following description taken in connection with the accompanying drawings, are attained by providing a piston with a plurality of circumferentially spaced peripheral grooves, and supporting elements movably disposed in each of these grooves engageable with the cylinder wall for supporting the piston in the cylinder bore. The supporting elements are constructed such that they each include a surface peripherally defining the outer side of a chamber in their respective grooves; and means are provided for causing the supporting elements to be biased into engagement with the cylinder wall, such biasing means preferably cooperating with the supporting elements for causing different biasing forces to be exerted on at least two thereof.

Brief description of the drawings

FIG. 1 is a fragmentary, elevational sectional view of a compressor cylinder containing a piston provided with one embodiment of the present invention;

FIG. 2 is an elevational sectional view taken through the rearward end of the piston;

FIG. 3 is an elevational sectional view taken on line 3—3 in FIG. 1, looking in the direction of the arrows;

FIG. 4 is an elevational sectional view generally similar to FIGS. 2 and 3, but showing the overlapping relationship of the supporting elements;

FIG. 5 is a view in perspective of one of the supporting elements shown in FIGS. 1 through 4;

FIG. 6 is a fragmentary, elevational sectional view of a compressor cylinder containing a piston provided with a modified embodiment of the invention;

FIG. 7 is an enlarged, fragmentary elevational sectional view taken on line 7—7 in FIG. 6, looking in the direction of the arrows; and FIG. 8 is a fragmentary, elevational sectional view of a compressor cylinder containing a piston provided with another modified embodiment of the invention.

Description of the preferred embodiments

Referring more particularly to the drawings wherein similar reference characters designate corresponding parts throughout the several views, FIG. 1 fragmentarily illustrates a compressor cylinder designated generally as 10 which comprises a generally horizontally disposed cylinder body 12 containing a generally horizontal cylinder bore 14 peripherally defined by an annular wall 16. A generally horizontal piston 18 is slidably disposed within the cylinder bore 14 and rigidly mounted upon one end of a piston rod 20. The other end of the piston rod 20 is suitably connected to a conventional crank or other suitable driving means (not shown) such that, during the operation of the compressor, the piston 18 is reciprocated in the cylinder bore 14 in the conventional manner. The cylinder 10, moreover, in the conventional manner is provided with inlet and exhaust passages (not shown), containing conventional valves, adjacent each of its ends such that the piston 18 acts to compress gas or other fluid during both its forward stroke (to the right as viewed in FIG. 1) and its rearward stroke (to the left as viewed in FIG. 1).

The piston 18, intermediate its ends, is provided with a pair of annular grooves 22, 24 containing sealing rings 26, 28 respectively. The sealing rings 26, 28 are biased by expander rings 30, 32, respectively, into engagement with the cylinder wall 16 and prevent fluid leakage intermediate the wall 16 and the outer circumference of the piston 18. The piston 18 adjacent its rearward (or left hand as viewed in FIG. 1) end is provided with a plurality of circumferentially spaced, peripheral grooves and, also, adjacent its forward (or right hand as viewed in FIG. 1) end is provided with a second plurality of circumferentially spaced, peripheral grooves.

The grooves adjacent the rearward end of the piston 18, as illustrated in FIG. 2, are constructed and arranged such that a pair of grooves 34, 36 are located adjacent the upper side of the piston 18, a single groove 38 is located at the lower side of the piston 18, and a pair of grooves 40, 42 are positioned in opposing relationship intermediate the upper and lower sides of the piston 18. The grooves 34, 36 slidably contain supporting elements 44, 46, respectively, adapted to support the upper side of the piston 18 in closely spaced relation to the cylinder wall 16. The grooves 40, 42 slidably contain supporting elements 48, 50, respectively, adapted to support the portion of the piston 18 intermediate its upper and lower sides in closely spaced relation to the cylinder wall 16; and the groove 38, similarly, slidably contains a supporting element 52 so supporting the lower side of the piston 18. The supporting elements 44, 46, 48, 50, 52 may, of course, be constructed from substantially any conventional piston ring material.

The supporting elements 44, 46, 48, 50, 52 are all of generally similar configuration and, as shown in FIG. 5 wherein the element 52 has been illustrated, each include an arcuate outer circumference 54 having a radius substantially that of the cylinder wall 16 and adapted for engaging the latter. The supporting elements 44, 46, 48, 50, 52, moreover, each include inwardly projecting legs 56, spaced by a surface 60, which cooperate with the walls of their respective grooves to enclose a chamber 58 bounded along its outer periphery by the surface 60. The supporting elements 48, 50 are constructed identically and include surfaces 60 of identical area; the supporting elements 44, 46 are constructed with surfaces 60 having a total combined area less than that of the surface 60 of the supporting element 52. The chambers 58 are each connected to one end of a fluid passage or bore 62, formed longitudinally in the piston 18, which at its opposing end communicates with the rearward end of the cylinder bore 14. Thus, during the operation of the compressor, pressurized fluid from the rearward end of the cylinder bore 14 flows through the bores 62 into the chambers 58 where it acts on the surfaces 60 to bias the supporting elements 44, 46, 48, 50, 52 into engagement with the cylinder wall 16. The biasing forces exerted on the supporting elements 48, 50, as will be seen, are substantially equal to ensure that the rearward end of the piston 18 is horizontally centered in the cylinder bore 14. The biasing forces exerted on the supporting elements 44, 46, however, are sufficiently lower than that on the supporting element 52 to compensate for the weight of the piston 18 and ensure vertical centering of the piston 18 in the cylinder bore 14.

The grooves adjacent the forward end of the piston 18, as illustrated in FIG. 3, are arranged to provide three grooves 64, 66, 68 adjacent the upper side of the piston 18 and two grooves 70, 72 adjacent the lower side of the piston 18. The grooves 64, 66, 68, 70, 72, respectively, slidably contain supporting elements 74, 76, 78, 80, 82 which, as indicated by the placement of reference characters in FIG. 3, each are formed of a configuration identical to that of the aforedescribed supporting elements at the rearward end of the piston 18. The supporting elements 74, 76, 78, 80, 82 hence, as illustrated in FIG. 3, each cooperate with the walls of their respective grooves to enclose a chamber 58 the outer periphery of which is bounded by a surface 60 of the supporting elements. These chambers 58 at the forward end of the piston 18 are each connected by a fluid passage or bore 84, formed longitudinally in the piston 18, to the cylinder bore 14 forwardly of the piston 18. The combined area of the surfaces 60 of the supporting elements 74, 76, 78, as will be understood, is sufficiently less than the combined area of the surfaces 60 of the supporting elements 80, 82 such that the biasing force tending to raise the forward end of the piston 18 is sufficiently greater than that tending to lower such end to compensate for the weight of the piston 18.

The grooves 64, 66, 68, 70, 72, moreover, are arranged such that their contained supporting elements 74, 76, 78, 80, 82 circumferentially overlap with the supporting elements 44, 46, 48, 50, 52 at the opposing end of the piston 18. This overlapping relationship, as illustrated in FIG. 4, is such that the ends of each of the supporting elements 74, 76, 78, 80, 82 circumferentially extend beyond the adjacent ends of two adjacent ones of the supporting elements 44, 46, 48, 50, 52. Thus, as will be understood, the supporting elements 74, 76, 78, 80, 82 cooperate to deter fluid leakage from passing peripherally around the piston 18.

During the operation of the aforedescribed apparatus, the pressurized fluid supplied to the chambers 58 through the bores 62, 84 acts on the surfaces 60 to bias the supporting elements into engagement with the cylinder wall 16. Thus, the piston 18 is maintained by the supporting elements in closely spaced relationship to the cylinder wall 16 throughout its reciprocation and frictional engagement between the piston 18 and the cylinder wall 16 is prevented.

FIGS. 6 and 7, wherein parts similar to those hereinbefore described with reference to the embodiment of the invention illustrated in FIGS. 1–5 are designated by the reference character for their similar previously described part followed by the suffix "a," fragmentarily illustrates a compressor cylinder 10a containing a piston 18a which is provided with a modified embodiment of the invention. In this embodiment, the rearward (or left hand) end of the piston 18a is provided with a peripheral groove 86 at its upper side and a peripheral groove 88 at its lower side; and the forward (or right hand) end of the piston 18a is similarly provided with a peripheral groove 90 at its upper side and a peripheral groove 92 at its lower side. The grooves 86, 88, 90, 92 are all of identical configuration and size and each slidably contain a supporting element 94 having an arcuate outer circumference 54a and inwardly projecting legs 56a cooperating with the walls of its respective groove to define therein a chamber 58a bounded along its outer circumference by a surface 60a of such supporting element. The supporting elements 94 are all identical in size and each are formed such that their surfaces 60a are identical in area. The supporting elements 94, moreover, may be formed from substantially any conventional piston ring material.

The chambers 58a in the grooves 86, 90 at the upper side of the piston 18a each communicate through a restricted bore 96 with the relatively narrow, annular chamber 98 formed between the outer circumference of the piston 18a and the cylinder wall 16a. The chambers 58a in the grooves 88, 92 at the lower side of the piston 18a are, however, dead ended such that fluid supplied thereto by the bores 62a, 84a is completely entrapped therein. Thus, although the surfaces 60a of the supporting elements 94 are of equal area, the pressurized fluid supplied to the chambers 58a serves to center the piston 18a in the cylinder bore 14a.

FIG. 8, wherein parts similar to those hereinbefore described with reference to the embodiments of the invention illustrated in FIGS. 1–7, are designated by the reference character for their similar previously described part followed by the suffix "b," fragmentarily illustrates a compressor cylinder 10b containing a piston 18b provided with another modified embodiment of the invention. This embodiment of the invention is different from that shown in FIGS. 6 and 7 only in that, instead of being fluid biased into engagement with the cylinder wall 16b, the supporting elements 94b are spring biased into such engagement. More particularly, as illustrated in FIG. 8, a channel spring 97 is positioned in each of the chambers 58b and arranged such that it urges the supporting element 94b in its respective groove into engagement with the cylinder wall 16b. The channel springs 97 in the grooves 88b, 92b at the lower side of the piston 18b are, of course, sufficiently stronger than those in the grooves 86b, 96b at the upper side of the piston 18b to ensure that the piston 18b is raised against the first mentioned springs 97 and centered in the cylinder bore 14b. Thus, in this embodiment of the invention, again a lesser biasing force is exerted on the supporting elements 94b in the grooves 86b, 90b than on those in the grooves 88b, 92b.

From the aforegoing it will be seen that we have provided new and improved means for accomplishing all of the objects and advantages of our invention.

Having thus described our invention, we claim:

1. The combination comprising:
a cylinder body containing a wall peripherally defining a cylinder bore;
a piston movably disposed in said cylinder bore for reciprocating movemnet therein and including peripheral grooves on its opposing sides;
supporting means movably disposed in each of said grooves engageable with said wall for supporting said piston in said cylinder bore, said supporting means each including a surface peripherally defining the outer side of a chamber in their respective grooves; and
means for causing said supporting means to be biased into engagement with said wall, said biasing means cooperating with said supporting means for causing different biasing forces to be exerted on two of said supporting means.

2. The combination of claim 1, further comprising said biasing means including passage means in said piston for supplying pressurized fluid to said chambers.

3. The combination of claim 1, further comprising said biasing means including passage means in said piston for supplying pressurized fluid to said chambers, and the area of said surface of two of said supporting means being different whereby the pressurized fluid exerts different biasing forces on such two supporting means.

4. The combination of claim 1, further comprising said biasing means including passage means in said piston for supplying pressurized fluid to said chambers, and second passage means communicating with one of said chambers for exhausting a restricted amount of pressurized fluid from such chamber whereby the fluid exerts a lesser biasing force on the supporting means in such chamber than on another of said supporting means.

5. The combination comprising:
   a cylinder body containing a wall peripherally defining a generally horizontal cylinder bore;
   a generally horizontal piston movably disposed in said cylinder bore for reciprocating movement therein and including at least one peripheral groove adjacent each of its upper and lower sides;
   a supporting element movably disposed in each of said grooves engageable with said wall to support said piston in said cylinder bore, said supporting elements each including a surface peripherally closing the outer side of a chamber in their respective grooves; and
   means for causing said supporting elements to be biased into engagement with said wall, said biasing means and said supporting elements cooperating such that the biasing force tending to raise said piston exceeds that tending to lower said piston whereby said piston is resultantly supported in spaced relationship to said wall throughout its periphery.

6. The combination of claim 5 further comprising said biasing means including passage means in said piston for supplying pressurized fluid to said chambers.

7. The combination of claim 6 further comprising said piston including a plurality of said grooves adjacent its upper and lower sides, said surfaces of the sealing elements located in grooves adjacent the lower side of said piston being of greater total area than said surfaces of the sealing elements located in grooves adjacent the upper side of said piston.

8. The combination of claim 5 further comprising passage means communicating with the chamber in the groove adjacent the upper side of said piston for exhausting a restricted amount of pressurized fluid from such chamber to provide said differential biasing forces.

9. The combination comprising:
   a cylinder body containing a wall peripherally defining a cylinder bore;
   a piston movably disposed in said cylinder bore for reciprocating movement therein and including a plurality of circumferentially spaced, peripheral grooves adjacent each of its ends;
   a supporting element movably disposed in each of said grooves engageable with said wall to support said piston in said cylinder bore, said supporting elements each including a surface peripherally closing the outer side of a chamber in their respective grooves;
   means for causing said supporting elements to be biased into engagement with said wall; and
   the grooves adjacent one of the ends of said piston being arranged such that the supporting elements disposed in such grooves overlaps with supporting elements disposed in grooves adjacent the other end of said piston for detering fluid leakage from passing peripherally around said piston.

10. The combination of claim 9 further comprising said cylinder bore and said piston being generally horizontally disposed and said biasing means cooperating with said supporting elements such that the biasing force tending to raise said piston exceeds the biasing force tending to lower said piston.

11. The combination of claim 10 further comprising said biasing means including passage means in said piston for supplying fluid to said chambers.

12. The combination of claim 10, further comprising said biasing means including passage means in said piston for supplying pressurized fluid to said chambers, and the area of said surface of two of said supporting elements being different whereby the pressurized fluid exerts different biasing forces on such two supporting elements.

References Cited

UNITED STATES PATENTS

| 1,933,943 | 11/1933 | Towell | 92—184 |
| 2,011,674 | 8/1935 | Canady et al. | 92—184 |
| 2,208,782 | 7/1940 | Workman | 92—193 |

CARROLL B. DORITY, JR., *Primary Examiner.*

U.S. Cl. X.R.

92—193